(12) United States Patent
Shalaby et al.

(10) Patent No.: US 11,031,009 B2
(45) Date of Patent: Jun. 8, 2021

(54) METHOD FOR CREATING A KNOWLEDGE BASE OF COMPONENTS AND THEIR PROBLEMS FROM SHORT TEXT UTTERANCES

(71) Applicant: Hitachi, Ltd., Tokyo (JP)

(72) Inventors: Walid Shalaby, Los Gatos, CA (US); Chetan Gupta, San Mateo, CA (US); Maria Teresa Gonzalez Diaz, Mountain View, CA (US); Adriano Arantes, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 16/380,343

(22) Filed: Apr. 10, 2019

(65) Prior Publication Data
US 2020/0327886 A1    Oct. 15, 2020

(51) Int. Cl.
*G10L 15/22*    (2006.01)
*G10L 15/18*    (2013.01)
*G10L 15/197*    (2013.01)

(52) U.S. Cl.
CPC .............. *G10L 15/22* (2013.01); *G10L 15/18* (2013.01); *G10L 15/197* (2013.01)

(58) Field of Classification Search
CPC ........ G10L 15/22; G10L 15/18; G10L 15/197
See application file for complete search history.

(56) References Cited

U.S. PATENT DOCUMENTS

| | | | |
|---|---|---|---|
| 2016/0350655 A1* | 12/2016 | Weiss | G06F 40/35 |
| 2017/0169143 A1 | 6/2017 | Farahat et al. | |
| 2018/0129648 A1* | 5/2018 | Chakravarthy | G06F 40/205 |
| 2018/0357220 A1* | 12/2018 | Galitsky | G06F 40/216 |
| 2019/0042870 A1* | 2/2019 | Chen | G06K 9/6274 |

(Continued)

OTHER PUBLICATIONS

Niraula, N. et al. "A Novel Approach to Part Name Discovery in Noisy Text" Proceedings of the 2018 Conference of the North American Chapter of the Association for Computational Linguistics: Human Language Technologies, Jun. 1-6, 2018, pp. 170-176 (7 pages); vol. 3 (Industry Papers); New Orleans, Louisiana.

(Continued)

*Primary Examiner* — Michael N Opsasnick
(74) *Attorney, Agent, or Firm* — Procopio, Cory, Hargreaves & Savitch LLP (57) ABSTRACT

Example implementations involve a framework for knowledge base construction of components and problems in short texts. The framework extracts domain-specific components and problems from textual corpora such as service manuals, repair records, and public Q/A forums using: 1) domain-specific syntactic rules leveraging part of speech tagging (POS), and 2) a neural attention-based seq2seq model which tags raw sentences end-to-end identifying components and their associated problems. Once acquired, this knowledge can be leveraged to accelerate the development and deployment of intelligent conversational assistants for various industrial AI scenarios (e.g., repair recommendation, operations, and so on) through better understanding of user utterances. The example implementations give better tagging accuracy on various datasets outperforming well known off-the-shelf systems.

11 Claims, 10 Drawing Sheets

(56) References Cited

U.S. PATENT DOCUMENTS

2019/0073353 A1\* 3/2019 Yu .................. G06F 40/211
2019/0228269 A1\* 7/2019 Brent ................ G06K 9/627

OTHER PUBLICATIONS

Hoy, M. "Alexa, Sid, Cortana, and More: An Introduction to Voice Assistants" Medical Reference Services Quarterly, 2018, pp. 81-88 (10 pages); vol. 37, No. 1.

Hao, Y. et al. "An End-to-End Model for Question Answering over Knowledge Base with Cross-Attention Combining Global Knowledge" Proceedings of the 55th Annual Meeting of the Association for Computational Linguistics, Jul. 30-Aug. 4, 2017, pp. 221-231(11 pages); vol. 1: Long Papers; Vancouver, Canada.

Sinha, A. et al. "An Overview of Microsoft Academic Service (MAS) and Applications" Proceedings of the 24th International Conference on World Wide Web, May 18-22, 2015, pp. 243-246 (4 pages); Florence, Italy.

Shalaby, W. et al. "Beyond Word Embeddings: Learning Entity and Concept Representations from Large Scale Knowledge Bases" Information Retrieval Journal; Jan. 30, 2018; pp. 1-18 (18 pages).

Zhang, F. et al. "Collaborative Knowledge Base Embedding for Recommender Systems" Proceedings of the 22nd ACM SIGKDD International Conference on Knowledge Discovery and Data Mining, Aug. 13-17, 2016; pp. 353-362 (10 pages); San Francisco, CA, USA.

Speer, R. et al. "ConceptNet 5: A Large Semantic Network for Relational Knowledge" 2013, pp. 161-176 (16 pages) Springer-Verlag, Berlin Heidelberg.

Auer, S. et al. "DBpedia: A Nucleus for a Web of Open Data" 2007, pp. 722-735 (14 pages); Springer-Verlag, Berlin Heidelberg.

Niu, F. et al. "DeepDive: Web-scale Knowledge-base Construction using Statistical Learning and Inference" VLDS, 12 Aug. 31, 2012; 4 pages; Istanbul, Turkey.

Mikolov, T. et al. "Distributed Representations of Words and Phrases and their Compositionality" Advances in Neural Information Processing Systems, 2013, pp. 1-9 (9 pages).

Luong, M-T. et al. "Effective Approaches to Attention-based Neural Machine Translation" 2015, arXiv preprint arXiv:1508.04025; 11 pages.

Bollacker, K. et al. "Freebase: A Collaboratively Created Graph Database for Structuring Human Knowledge" Proceedings of the 2008 ACM SIGMOD International Conference on Management of Data, Jun. 9-12, 2008, pp. 1247-1249 (3 pages), Vancouver, BC, Canada.

Dong, X. et al. "Knowledge Vault: A Web-Scale Approach to Probabilistic Knowledge Fusion" Proceedings of the 20th ACM SIGKDD International Conference on Knowledge Discovery and Data Mining (2014), pp. 601-610 (10 pages).

Hu, M. et al. "Mining and Summarizing Customer Reviews" Proceedings of the tenth ACM SIGKDD International Conference on Knowledge Discovery and Data Mining, Aug. 22-25, 2004, pp. 168-177 (10 pages), Seattle, Washington, US.

Bahdanau, D. et al. "Neural Machine Translation by Jointly Learning to Align and Translate" Published as a conference paper at ICLR 2015, pp. 1-15 (15 pages).

Banko, M. et al. "Open Information Extraction from the Web" IJCAI, 07, pp. 2670-2676 (7 pages).

Ramshaw, L. et al. "Text Chunking using Transformation-Based Learning" ACL Third Workshop on Very Large Corpora, Jun. 1995, pp. 1-13 (13 pages).

Manning, C. et al. "The Stanford CoreNLP Natural Language Processing Toolkit" Proceedings of 52nd Annual Meeting of the Association for Computational Linguistics: System Demonstrations, Jun. 23-24, 2014, pp. 55-60 (6 pages), Baltimore, Maryland USA.

Carlson, A. et al. "Toward an Architecture for Never-Ending Language Learning" Proceedings of the Twenty-Fourth AAAI Conference on Artificial Intelligence (AAAI-10), 2010, pp. 1306-1313 (8 pages).

Chandramouli, A. et al. "Unsupervised Extraction of Part Names from Service Logs" Proceedings of the World Congress on Engineering and Computer Science, Oct. 23-25, 2013, 3 pages, San Francisco, CA, USA.

Hoffart, J. et al. "YAGO2: A spatially and temporally enhanced knowledge base from Wikipedia" Artificial Intelligence 194 (2013) pp. 28-61 (34 pages).

\* cited by examiner

| Utterance | POS | Rule |
|---|---|---|
| Replace Water Pump | VB (NN\S*\s?)+ | (NN\S*\s?)+ component |
| *Low* oil pressure | JJ (NN\S*\s?)+ | JJ problem, (NN\S*\s?)+ component |
| Fuel Filter is *dirty* | (NN\S*\s?)+ VBZ JJ | (NN\S*\s?)+ component, JJ problem |
| Coolant reservoir *cracked* | (NN\S*\s?)+ VBD | (NN\S*\s?)+ component, VBD problem |
| Truck *leaking water* | (NN\S*\s?)+ VBG (NN\S*\s?)+ | (NN\S*\s?)+ component, VBG (NN\S*\s?)+ problem |
| Coolant surge tank is *leaking* | (NN\S*\s?)+ VBZ VBG | (NN\S*\s?)+ component, VBG problem |

|  | QA forum #1 | QA forum #2 |
|---|---|---|
| Sample utterances | Draining wiper flued, Possible Transmission fluid leak... | Rough Start, will not crank... |
| # of utterances | ~15K | ~26K |
| # of syntactic-rule matching utterances | 930 (~6%) | 670(~3%) |
| # of extracted components | 513 | 372 |
| # of extracted components | 428 | 234 |

METHOD FOR CREATING A KNOWLEDGE BASE OF COMPONENTS AND THEIR PROBLEMS FROM SHORT TEXT UTTERANCES

BACKGROUND

Field

The present disclosure is generally directed to machine learning implementations, and more specifically, for methods of creating a knowledge base of components and associated problems from text utterances for incorporation into a machine learning implementation.

Related Art

Knowledge Base (KB) construction from text aims at converting the unstructured noisy textual data into a structured task-specific actionable knowledge that captures entities (elements of interest (EOI)), their attributes, and their relationships. KBs are key components for many artificial intelligence (AI) and knowledge-driven tasks such as question answering, decision support systems, recommender systems, and others.

Related art implementations build KBs through extracting information about target entities, attributes, and relationships between them through the use of related art information extraction frameworks. Such frameworks utilize Natural Language Processing (NLP) techniques such as Part of Speech Tags (POS), shallow parsing, and dependency parse trees to extract linguistic features for recognizing entities.

SUMMARY

Although related art implementations have involved constructing general purpose KBs, identifying component names and their associated problems in text has not been considered widely. Example related art implementations directed to such approaches to identify component names in service and maintenance logs use a combination of linguistic analysis and machine learning. In a related art implementation, seed head nouns representing high level part names (e.g., valve, switch) are utilized, from which all n-grams ending with the head nouns are extracted. Afterwards, the extracted n-grams are purified using heuristics. Finally, the purified part names are used to create an annotated training data for training a Conditional Random Fields (CRF) model to extract part names in raw sentences.

In another related art approach, there is n-gram extraction from service logs. Given a seed of part types, the authors extract all n-grams with maximum three tokens that end with these part types. Then candidate n-grams are scored using a mutual information metric, and then purified using POS tagging.

Example implementations described herein involve a framework for knowledge base construction of components and problems in noisy texts. The framework extracts domain-specific components and problems from textual corpora such as service manuals, repair records, and public question and answer (QA) forums using: 1) domain-specific syntactic rules leveraging POS tagging, and 2) a neural attention-based sequence to sequence (seq2seq) model which tags raw sentences end-to-end identifying components and their associated problems. Once acquired, this knowledge can be leveraged to accelerate the development and deployment of intelligent conversational assistants for various industrial AI scenarios (e.g., repair recommendation, operations, etc) through better understanding of user utterances. The key contributions of this invention include:

Example implementations involve a framework for automatically constructing knowledge that can be used to recommend solutions to user complaints for an arbitrary target domain. The example implementation framework targets extracting domain-specific components and part names, and also their associated problems. Unlike related art implementations, the example implementations described herein start the extraction process with seed syntactic rules rather than seed head nouns. Such example implementations cover more components and problems vocabulary. Additionally, the use of syntactic rules rather than seed nouns is more practical as it requires less domain knowledge.

In example implementations described herein, there is a traversal method to create a hierarchy of components from the extracted components vocabulary. Components at the top of the hierarchy represent high level and generic ones (supertypes) which can be common across domains (e.g., sensor, switch, pump, etc.). The hierarchy allows introducing "subtype <is-a> supertype" relationship between components (e.g., fuel level sensor <is-a> sensor).

Example implementations further utilize an aggregation method to automatically associate between supertype components and problems of their subtypes. This allows introducing new "supertype <has-a> problem" relationships in the constructed KB. Example implementations further utilize unsupervised curation and purification of the extracted entities, unlike related art implementations which require human supervision to perform KB curation. The framework in example implementations utilize deep learning for sequence tagging to annotate raw sentences with component(s) and problem(s).

Through the example implementation framework that is trained on a dataset labeled with entities extracted through syntactic rules described herein, better tagging accuracy can be achieved on test datasets than related art implementation systems.

Aspects of the present disclosure can involve a method for processing speech for a voice assistant system, the method involving processing the speech through a deep learning trained framework configured to identify components and problems from the speech through syntactical rules to extract a component and a problem associated with the component from the speech received through the voice assistant system from the processing; providing the component and the problem to a recommendation framework configured to generate a recommendation for the component and the problem; and outputting the recommendation for the component and the problem through the voice assistant system.

Aspects of the present disclosure can involve a computer program, storing instructions for processing speech for a voice assistant system, the instructions involving processing the speech through a deep learning trained framework configured to identify components and problems from the speech through syntactical rules to extract a component and a problem associated with the component from the speech received through the voice assistant system from the processing; providing the component and the problem to a recommendation framework configured to generate a recommendation for the component and the problem; and outputting the recommendation for the component and the problem through the voice assistant system. The instructions can be stored on a non-transitory computer readable medium and configured to be executed by one or more processors.

Aspects of the present disclosure can involve a system for processing speech for a voice assistant system, the system involving means for processing the speech through a deep learning trained framework configured to identify components and problems from the speech through syntactical rules to extract a component and a problem associated with the component from the speech received through the voice assistant system from the processing; means for providing the component and the problem to a recommendation framework configured to generate a recommendation for the component and the problem; and means for outputting the recommendation for the component and the problem through the voice assistant system.

Aspects of the present disclosure involve a voice assistant system, which involves a microphone configured to receive speech; a speaker; and a processor, configured to process the speech through a deep learning trained framework configured to identify components and problems from the speech through syntactical rules to extract a component and a problem associated with the component from the speech received through the microphone; provide the component and the problem to a recommendation framework configured to generate a recommendation for the component and the problem; and output the recommendation for the component and the problem through the speaker.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In example implementations described herein, there is a framework for automatically constructing Knowledge Base (KB) of physical/industrial component and problem entities with "component <has-a> problem" relationships. The framework has a generic and domain-independent design making it applicable for extracting the target knowledge across different verticals. The proposed KB framework facilitates fast and easy development and deployment of Natural Language Understanding systems (NLU), such as chatbots, virtual conversational assistants/agents, via auditory (voice) or textual methods in a variety of industrial scenarios. Example implementations described herein also improve AI-based systems that uses natural language (free text and voice) like repair recommendation systems to better understand customer complaints.

There can be a large volume of unstructured textual content that contains such information in unstructured free text format or semi-structured tables format. Creating a structured representation of such entities can provide several technical effects. For example, virtual assistants are becoming commonly used nowadays to help users accomplish their tasks more efficiently and effectively through voice interaction with the system.

In the context of system troubleshooting and repair recommendation assistants, a KB of components and their associated problems would facilitate better understanding of what the user is complaining about. Another application of the example implementations is to improve the repair recommendation engine, through better processing of customer complaint text. In other words, identifying components(s) and problem(s) in the noisy customer complaint text and focusing on these entities only while predicting the repair.

Other benefits of the proposed KB construction framework include accelerating the development and deployment of intelligent conversational assistants for various industrial AI scenarios (e.g., repair recommendation, operations, etc.) through better understanding of user utterances. In addition, the KB is among a set of tools that could potentially automate the whole deployment process of voice-enabled AI solutions making it easier to use NLU systems of any vendor.

Figure 1A:
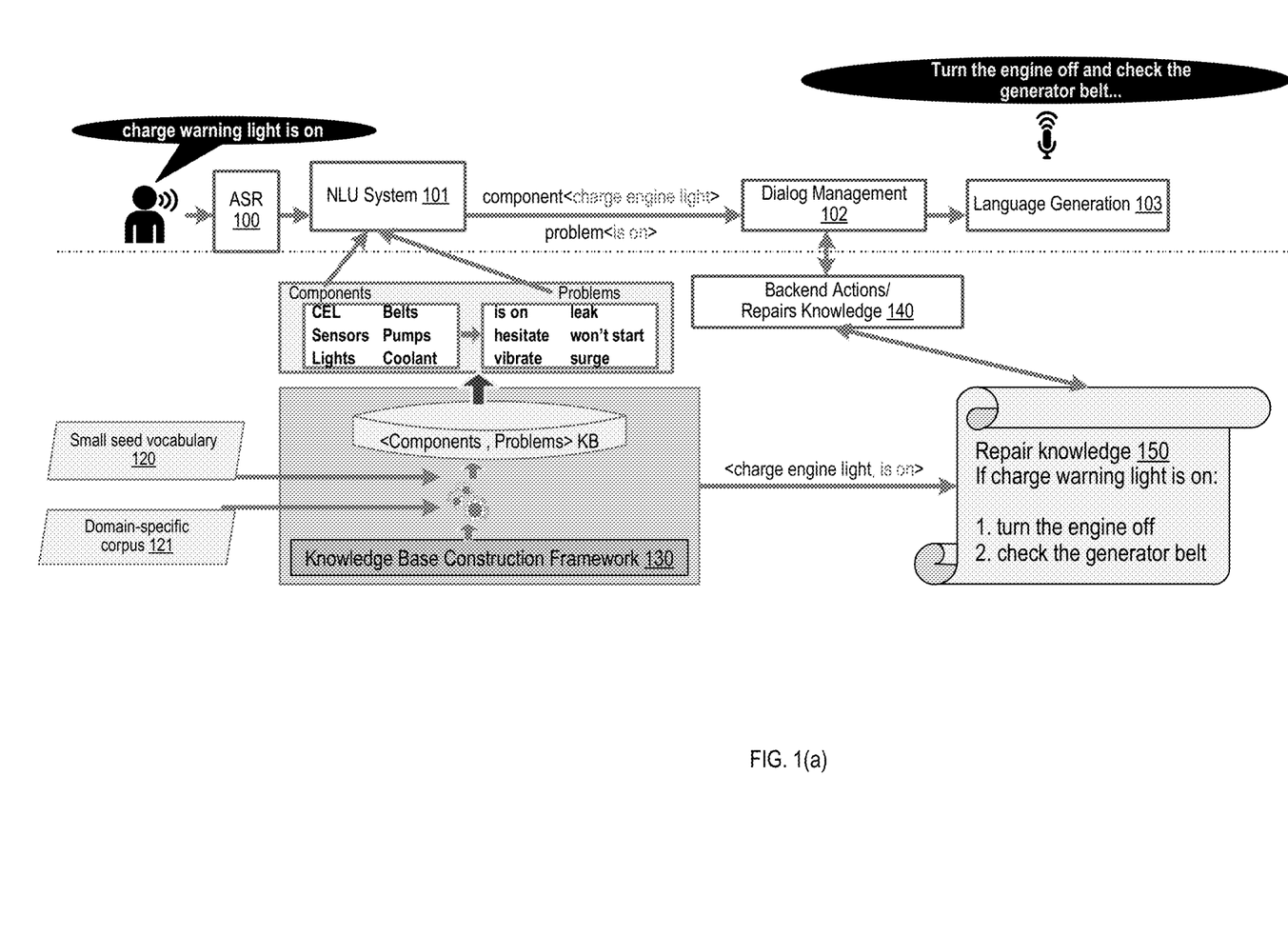
FIG. 1(a) illustrates an overall system flow, in accordance with an example implementation.

FIG. 1(a) illustrates an overall system flow, in accordance with an example implementation. As shown in FIG. 1(a), example implementations create a vocabulary of components, problems, and possibly repairs through a knowledge construction pipeline by incorporating a small seed vocabulary 120 as well as reading domain-specific text corpora 121 such as service bulletins, Diagnostic Trouble Codes (DTC) manuals, maintenance and repair records, and public Question Answering (QA) forums. Once created by the knowledge base construction framework 130, this vocabulary can be used by any NLU and repair recommendation system to better understand and serve user needs.

In an example implementation, a user makes an utterance to an automatic speech recognition (ASR) system 100 which converts the utterance into text or keywords to be processed by the NLU system 101. The NLU system, when trained by the KB construction framework 130 in accordance with example implementations, can thereby parse the utterance into words related to components and words related to problems. Such classifications can then be provided to a dialog management system 102, which has access to backend actions or repair knowledge 140 that accesses a database of repair knowledge 150 to determine the solution. In such an implementation, the repair knowledge 150 is provided with the component and problem to determine the solution to provide to the backend actions or repair knowledge 140. Dialog management system 102 then provides the results to language generation 103 which generates the spoken solution to the assistant device, which outputs as speech.

In example implementations described herein, the KB construction framework 130 works through two main stages: 1) domain-specific syntactic rules leveraging Part-Of-Speech (POS) to create an initial vocabulary of target entities, and 2) a neural attention-based sequence-to-sequence model which tags raw sentences end-to-end identifying components and their associated problems, and facilitating the extraction of more entities from structures not covered by the syntactic rules.

The framework goes one step further by not only extracting components and part names, but also their associated problems. Unlike related art implementations, the example implementations start with syntactic rules rather than seed head nouns. The rules require less domain knowledge and should yield higher coverage. The example implementations then expand the constructed KB through two steps: 1) reorganizing the extracted vocabulary of components into a hierarchy using a simple traversal mechanism introducing <is-a> relationships (e.g., stop light <is-a> light), and 2) aggregating all the problems associated with subtype components in the hierarchy and associate them with supertype components introducing more <has-a> relationships (e.g., coolant gauge <has-a> not reading→gauge <has-a> not reading). Unsupervised curation and purification of extracted entities is another key differentiator of the example implementations in comparison to related art solutions. The proposed framework utilizes a state-of-the-art deep learning for sequence tagging to annotate raw sentences with component(s) and problem(s).

In the examples described herein, the example of creating a KB of entities related to vehicle complaint understanding is utilized. Nevertheless, the example implementations can be extended to any other maintenance and repair scenarios given a corpus with mentions of the same entities.

Figure 1B:
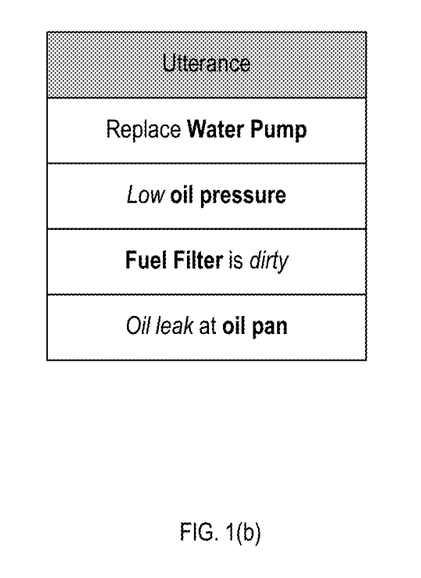
FIG. 1(b) illustrates an example of sample utterances, in accordance with an example implementation.

FIG. 1(*b*) illustrates an example of sample utterances, in accordance with an example implementation. Specifically, the examples of FIG. 1(*b*) are sample utterances from repair and service logs. In the examples, the words indicated in italics indicate a problem, and the bolded words indicate a component. The utterances are example input that could be provided by text or through ASR 100.

Further, most of the knowledge extracted about problem entities can be widely applied across verticals (e.g., fail, overheat, leak). By organizing the knowledge about component entities into a hierarchy, high level components (e.g., sensor, switch, pump) can also be used across domains to bootstrap the extraction process.

Figure 2A:
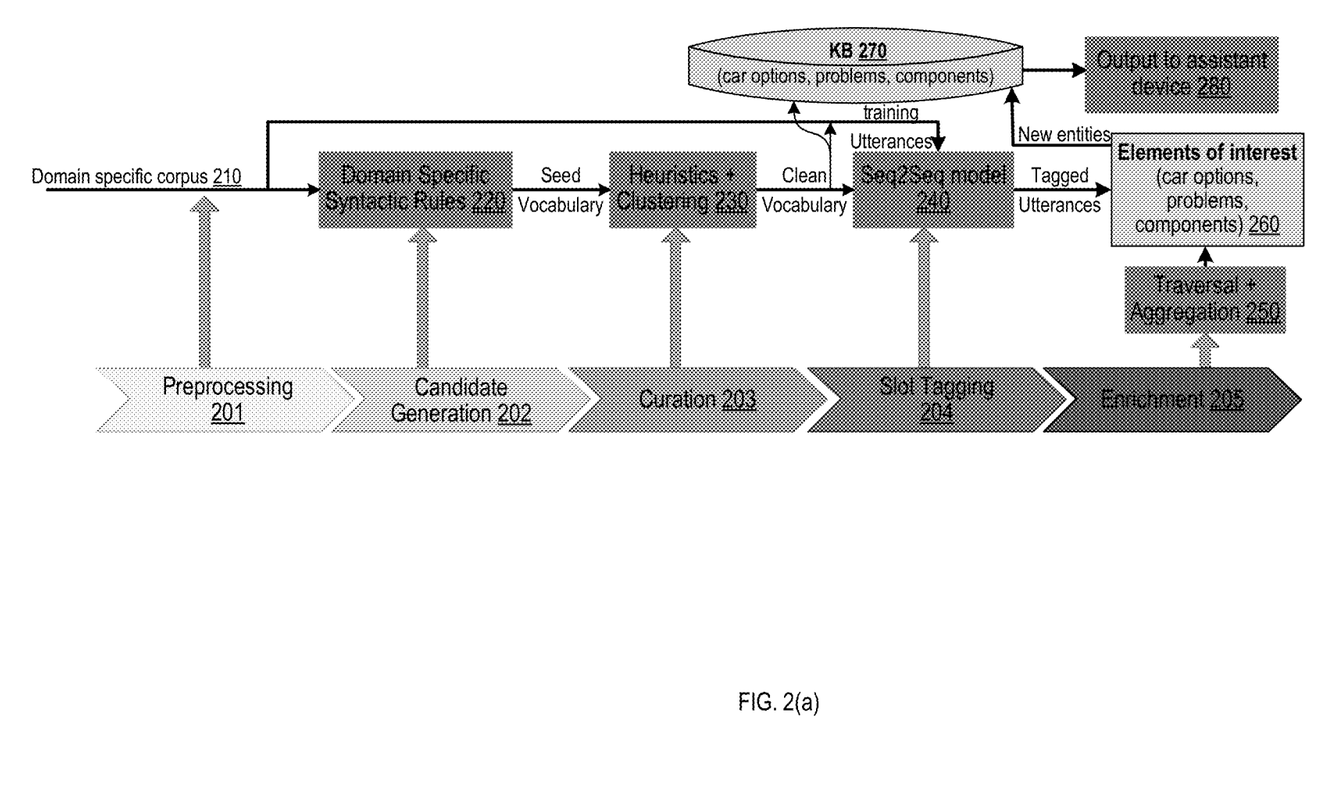
FIG. 2(a) illustrates an overall flow for the KB construction framework, in accordance with an example implementation.

FIG. 2(*a*) illustrates an overall flow for the KB construction framework, in accordance with an example implementation. As shown in FIG. 2(*a*), the proposed KB construction framework is organized as a pipeline. At first there is a domain-specific corpus 210 (e.g., service bulletins, repair records, DTC manuals, QA forums) that contains the target entities. The corpus 210 is processed through several stages including preprocessing 201, candidate generation using POS-based syntactic rules 202, embedding-based filtration and curation 203, and enrichment 205 through training a seq2seq slot tagging model 204.

The pipeline produces various outputs. One output is the KB of three types of entities including car options (car, truck, vehicle, etc.), components, and their associated problems. These entities can be used to populate the vocabulary needed to build voice-based agents with various modern systems. Another output is a tagging model. Besides its value in enriching the KB with new entities, the tagging model can also be used as a standalone NLU system that is configured to extract target entities from raw sentences.

FIG. 1(*b*) illustrates examples of complaint or correction utterances from repair logs. As illustrated in FIG. 1(*b*), most of these utterances are short sentences composed of a component along with an ongoing problem or an action. The pipeline process is described in more detail as follows based on the utterances of FIG. 1(*b*).

Preprocessing 201

Dealing with noisy text can be challenging. In the case of repair recommendation as an example, repair records include complaint, diagnosis, and correction text which represent highly rich resources of components and problems that might arise with each of them. Nevertheless, these records are typically written by technicians and operators who have time constraints and may have a lack of language proficiency. Consequently, these textual records will be full of typographical errors, spelling mistakes, inconsistent use of vocabulary, and domain-specific jargon and abbreviations. For these reasons, cautious use of preprocessing is required to reduce such inconsistencies and avoid inappropriate corrections. Example implementations of the framework performs the following preprocessing steps:

Lowercase.

Soft normalization: by removing punctuation characters separating single characters (e.g., a/c, a.c, a.c.→ac).

Hard normalization: by collecting all frequent tokens that are prefixes of a larger token and manually replace them with their larger version (e.g., temp→temperature, eng→engine, diag→diagnose . . . etc).

Dictionary-based normalization: create a dictionary of frequent abbreviations and use it to normalize tokens in the original text (e.g., chk, ch, ck→check)

Manual tagging: manually tag terms as vehicle, car, truck, etc. as a car-option entity.

Candidate Generation 202

Figure 2B:
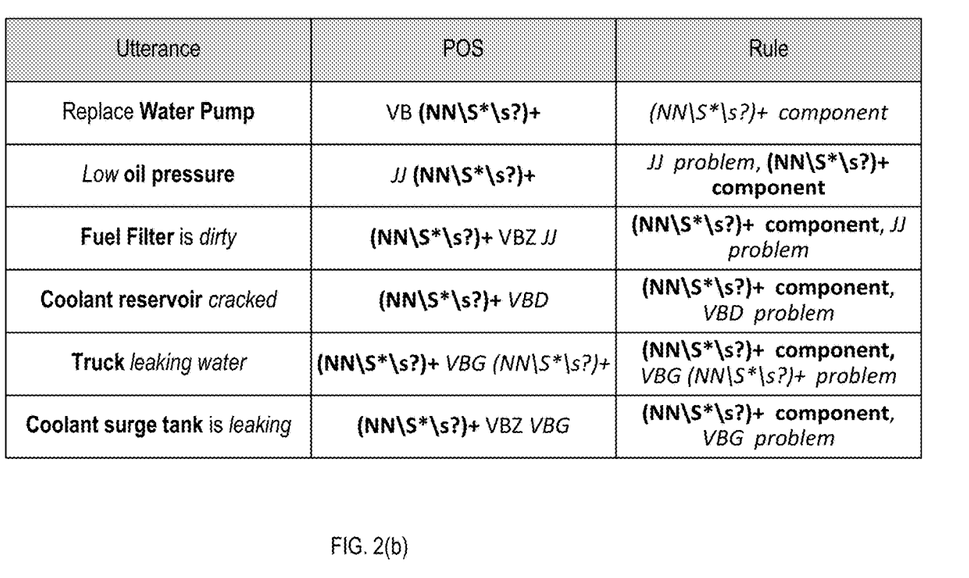
FIG. 2(b) illustrates an example of rules defined for the most frequent six POS patterns, in accordance with an example implementation.

To extract candidate entities, example implementations utilize a set of syntactic rules based on POS tags of complaint utterances. First, all sentences are extracted and parsed using the CoreNLP library. Second, linguistic heuristics are used to define chunks of tokens corresponding to component and problem entities based on their POS tags. Specifically, example implementations define the rules considering only the most frequent POS patterns in the dataset, which are utilized as domain specific syntactic rules 220.

FIG. 2(*b*) illustrates an example of rules 220 defined for the most frequent six POS patterns, in accordance with an example implementation. In the example of FIG. 2(*b*), *NN represents noun, JJ represents adjective, VBD represents verb past tense, and VBG represents verb present participle. As in reference to similar entries from FIG. 1(*b*), the patterns indicated in italics indicate a problem, and the patterns indicated in bold indicate a component.

For example, whenever a sentence POS pattern matches an adjective followed by sequence of nouns of arbitrary length (JJ (NN†S*†s?)+$) (e.g. "low air pressure"), the adjective chunk is considered a candidate problem entity ("low") and the noun sequence chunk is considered a candidate component entity ("air pressure"). The defined heuristics are designed to capture components with long multi-term names which are common in the dataset (e.g., "intake manifold air pressure sensor"). Example implementations also discard irrelevant tokens in the extracted chunk such as determiners (a, an, the) preceding noun sequences and others. Based on the processing of the most frequent patterns, the domain specific syntactic rules 220 can be determined as illustrated in FIG. 2(b).

Curation 203

In this stage, example implementations prune incorrect and noisy candidate entities using weak supervision. It has been determined that most of these wrong extractions were due to wrong annotations from the POS tagger due to the noisy nature of the text. For example, "clean" in "clean tank" could be incorrectly tagged as an adjective rather than verb causing "clean" to be added to the candidate problems pool. In another example, "squeals" in "belt squeals" was tagged as a plural noun rather than verb causing "belt squeals" to be added to the candidate components pool. To alleviate these issues, example implementations employ different weak supervision methods to prune incorrectly extracted entities sequentially as follows:

Statistical-based pruning: a simple pruning rule is to eliminate candidates that rarely appear in our dataset with frequency less than F.

Linguistic-based pruning: these rules focus on the number and structure of tokens in the candidate entity. For example, a candidate entity cannot exceed T terms, must have terms with a minimum of L letters each, and cannot have alphanumeric tokens.

Embedding-based pruning: fixed-length distributed representation models (e.g., embeddings) have proven effective for representing words and entities in many NLP tasks. Example implementations exploit the fact that these models can effectively capture similarity and relatedness relationships between pairs of words and entities using their embeddings. To this end, example implementations utilize models to obtain the vector representations of all candidates. Then, the example implementations normalize all vectors and compute the similarity score between pairs of candidates using the dot product between their corresponding vectors. Afterwards, the example implementations prune all candidate problems that do not have at least P other problem entities with a minimum of $S_p$ similarity score, and prune all components that do not have at least C other component entities with a minimum of $S_c$ similarity score.

Sentiment-based pruning: utterances that express problems and issues usually have negative sentiment. Under this assumption, example implementations prune all candidate problem entities that are not semantically similar to at least one word from the list of negative sentiment words. In example implementations, the similarity score is measured using the embeddings of candidate problem entities and the sentiment words as in the embedding-based pruning. Sentiment-based pruning helps discarding wrong extractions such as "clean" in "clean tank" where "clean" is tagged incorrectly as an adjective.

From the curation, heuristics and clustering 230 is generated.

Slot Tagging 204

A desideratum of any information extraction system is to be lexical-agnostic, that is, to be able to generalize well and identify unknown entities that have no mentions in the original dataset. Another desideratum is to be structure-agnostic, that is, to be able to generalize well and identify unseen or new entities in utterances with different structures from those in the original dataset.

Implementations that depend solely on rule-based candidate extraction limits the system recognition capacity to mentions in structures that match these predefined rules, even though such implementations yield highly precise extractions. Moreover, it is infeasible to handcraft rules that cover all possible complaint structures, limiting the system recall. It is also expected that new components and problems will emerge, especially in highly dynamic domains, and running the rules on an updated snapshot of the dataset would be an expensive solution.

Example implementations described herein involve a more practical and efficient solution which involves building a machine learning model to tag raw sentences and identify chunks of tokens that correspond to our target entities. To this end, example implementations utilize a neural attention-based seq2seq model 240 to tag raw sentences and extract target entities from them. To train the seq2seq model 240, example implementations create a dataset from utterances that match the syntactic rules and label terms in these utterances using the inside-outside-beginning (IOB) notation. For example, "the truck air pressure is low" would be tagged as "<O><car-options><B-component><I-component><O><B-problem>". As the extractions from the syntactic rules followed by curation are highly accurate, the example implementations described herein can be expected to have highly accurate training data for our tagging model. It is worth mentioning that example implementations only use utterances with mentions of entities not pruned during the curation phase.

Figure 3:
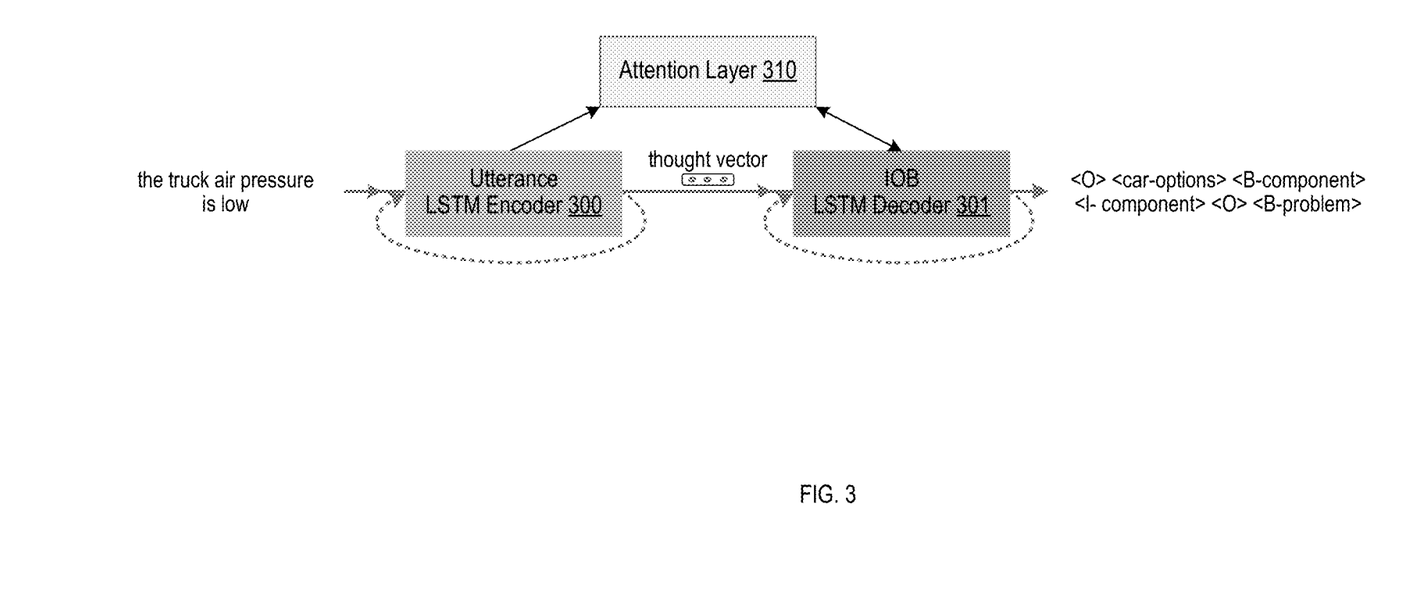
FIG. 3 illustrates an example of the seq2seq model, in accordance with an example implementation.

FIG. 3 illustrates an example of the seq2seq model, in accordance with an example implementation. As shown in FIG. 3, the seq2seq model utilizes encoder-decoder Recurrent Neural Network architecture (RNN) with Long-Short Term Memory (LSTM) cells. During encoding, raw terms in each sentence are processed sequentially through an RNN 300 and encoded as a fixed-length vector that captures all the semantic and syntactic structures in the sentence. Then, a decoder RNN 301 takes this vector and produces a sequence of IOB tags, one for each term in the input sentence. Because each tag might depend on one or more terms in the input but not the others, example implementations utilize an attention mechanism 310 so that the network learns what terms in the input are more relevant for each tag in the output.

KB Consolidation and Enrichment 205

At this stage, example implementations enrich the KB with new entities not explicitly mentioned in the training utterances. These new entities are obtained from three different sources:

Seq2Seq model: after training the seq2seq model, example implementations utilize the model to tag the remaining utterances in our dataset which do not match the syntactic rules resulting in a new set of entities. Importantly, the trained model can be used to tag newly unseen utterances allowing the proposed KB framework to scale efficiently whenever new utterances are collected.

Figure 4A:
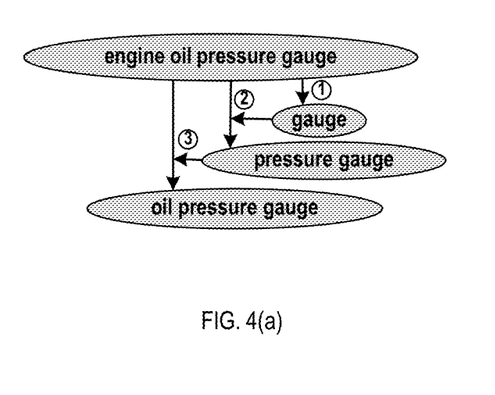
FIG. 4(a) illustrates an example of component backward traversal, in accordance with an example implementation.

Component backward traversal: example implementations propose using a simple traversal method to create a hierarchy of supertype components from the extracted components vocabulary after curation and tagging using the seq2seq model. FIG. 4(a) illustrates an example of component backward traversal, in accordance with an example implementation. As shown in FIG. 4(a) each extracted component (subtype) is considered, and the tokens are backward traversed one token at a time. At each step, example implementations append the new token to the component identified in the previous traversal step (supertype). For example, traversing "engine oil pressure gauge" will result in "gauge", "pressure gauge", and "oil pressure gauge" in order as illustrated in FIG. 4(a). As a result, components at the top of the hierarchy represent high level and generic ones (supertypes) which can be common across domains (e.g., sensor, switch, pump, etc.). The hierarchy allows introducing "subtype <is-a> supertype" relationship between components enriching the KB with more supertype components.

Figure 4B:
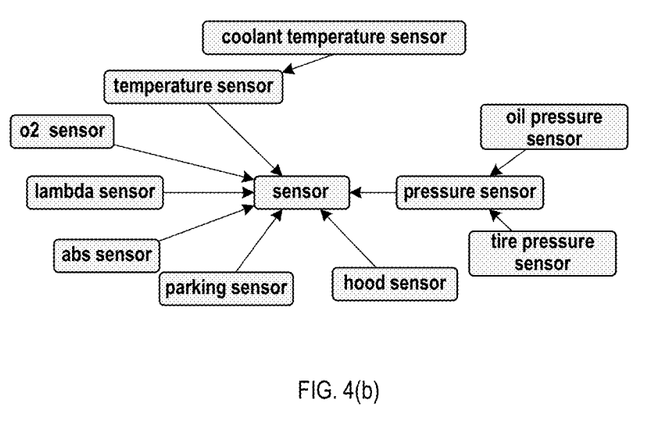
FIG. 4(b) illustrates an example of problem aggregation, in accordance with an example implementation.

Problem aggregation: the new components identified through backward traversal will initially have no problems associated with them. Example implementations utilize a simple aggregation method to automatically associate between supertype components and problems of their subtypes. First, the example implementations start with the leaf subtype components in the hierarchy. Second, the example implementations navigate through the hierarchy upward one level at a time. At each step, the example implementations combine all the problems from the previous level and associate them to the supertype component at the current level. For example, all problems associated with "oil pressure sensor", "tire pressure sensor", etc. will be aggregated and associated with "pressure sensor". Then problems of "pressure sensor", "o2 sensor", "abs sensor", etc. will be aggregated and associated with "sensor". The result of the problem aggregation is illustrated in FIG. 4(b). This simple aggregation method allows introducing new "supertype <has-a> problem" relationships in the constructed KB.

Example implementations consolidate the entities 230 from the curation stage 203 along with the new entities from the elements of interest 260 discovered at each of the three steps of traversal and aggregation 250 to create the KB 270 of components and problems entities as shown in FIG. 2(a). The outputs of the KB 270 can be provided to an assistant device 280 configured to output the recommendations as text or speech.

Figure 5:
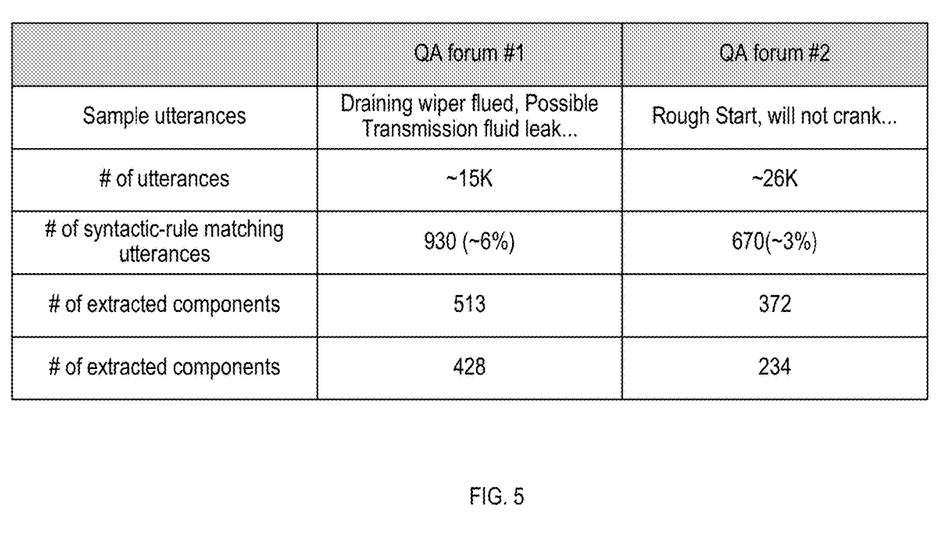
FIG. 5 illustrates some example utterances and statistics from each dataset, in accordance with an example implementation.

In an example implementation, the KB framework as described herein were applied on two datasets created from public QA forums in the automotive sector. FIG. 5 illustrates some example utterances and statistics from each dataset, in accordance with an example implementation. As illustrated in FIG. 5, the coverage of syntactic rules is noticeably low with all the datasets. This demonstrates the need for a learning-based entity extractor, such as the proposed seq2seq model to harness the knowledge from utterances not matching the predefined rules.

In an example implementation, a labeled dataset for the seq2seq model was generated using the QA forums utterances. After candidate extraction, example implementations curate the extracted entities as illustrated in FIG. 2(a). Then, the example implementations tag only utterances with entity mentions found in the curated entities pool.

To increase the model responsiveness to variants of utterances in the original dataset, the example implementation augment the tagged utterances with variants associated with some carrier phrases such as ("my car has <problem>", "I have <problem>", "<utterance> what should I do", etc.). In total, the example implementations randomly chose $\frac{1}{8}^{th}$ of the original utterances, augment them, then add them to the training dataset.

To train the model, the example implementations split the tagged dataset into 80% for training and 20% for testing, and train the model using an embedding layer of size=200, attention layer of size=200, for 80 epochs on a single GPU machine. The accuracy on the testing set through the example implementations turned out to have a higher accuracy on average (>~80%) versus the related art (~70%).

Thus, example implementations can be used to automatically construct knowledge that can be used to recommend solutions to user complaints for an arbitrary target domain; speed up and ease the development and deployment of natural language understanding systems, such as chatbots, virtual conversational assistants/agents, via auditory (voice) or textual methods in a variety of industrial scenarios; and improve AI-based systems that uses natural language (free text and voice) like repair recommendation systems to better understand customer complaints.

The pipeline of the example implementations facilitates automatically constructing the knowledge required to understand users complaints in arbitrary target domain (e.g., automotive). By creating such knowledge about components and problems associated with them, it is possible to identify what the user is complaining about.

One of the benefits of the proposed KB construction framework is facilitating the development and deployment of intelligent conversational assistants for various industrial AI scenarios (e.g., repair recommendation, operations, etc.) through better understanding of user utterances. The constructed KB from repair logs facilitated developing two voice-enabled assistants without any finetuning or adaption. Thus the proposed pipeline is an important tool to potentially automate the deployment process of voice-enabled AI solutions making it easy to use NLU systems of any vendor. In addition, the example implementations provide scalable and efficient mechanism to extend the constructed KB beyond the handcrafted extraction rules.

Another benefit is to improve the repair recommendation engine through better processing of customer complaint text. In other words, identifying components(s) and problem(s) in the noisy customer complaints text and focusing on these entities only while predicting the repair. Concretely, the below features are readily available with the KB created from the repair logs:

Complaint normalization: "low on oil" & "low oil" will both map to component: "oil",problem: "low".

Capturing multiple problems in the same complaint: "check engine light on service engine light flashes after start up" will be broken into: 1) component: "check engine light", problem: "on", and 2) component: "service engine light", problem: "flashes".

Cleaning noise in complaints and discarding irrelevant keywords: "road call coolant leak" will result in component: "coolant", problem: "leak".

Figure 6:
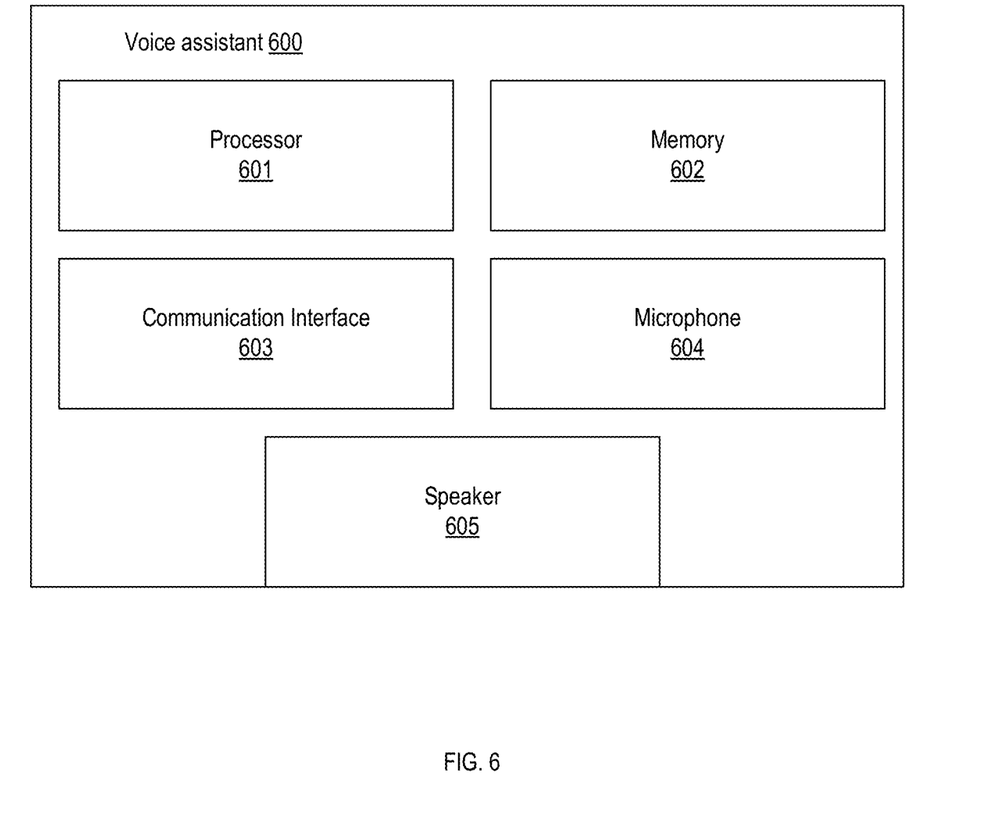
FIG. 6 illustrates an example hardware diagram for a voice assistant, in accordance with an example implementation.

FIG. 6 illustrates an example hardware diagram for a voice assistant 600, in accordance with an example implementation. The voice assistant 600 may include a processor 601, a memory 602, a communication interface with a baseband processor 603, a microphone 604 configured to receive speech (e.g., voice), and a speaker 605. Memory 602 may store instructions that can be loaded into processor 601 to execute the flow diagram as illustrated, for example, in FIGS. 1(a), 2(a) and 8 as well as to store the deep learning trained framework configured to identify components and problems from the speech through syntactical rules to extract a component and a problem associated with the component from the speech received through the microphone 604.

Figure 7:
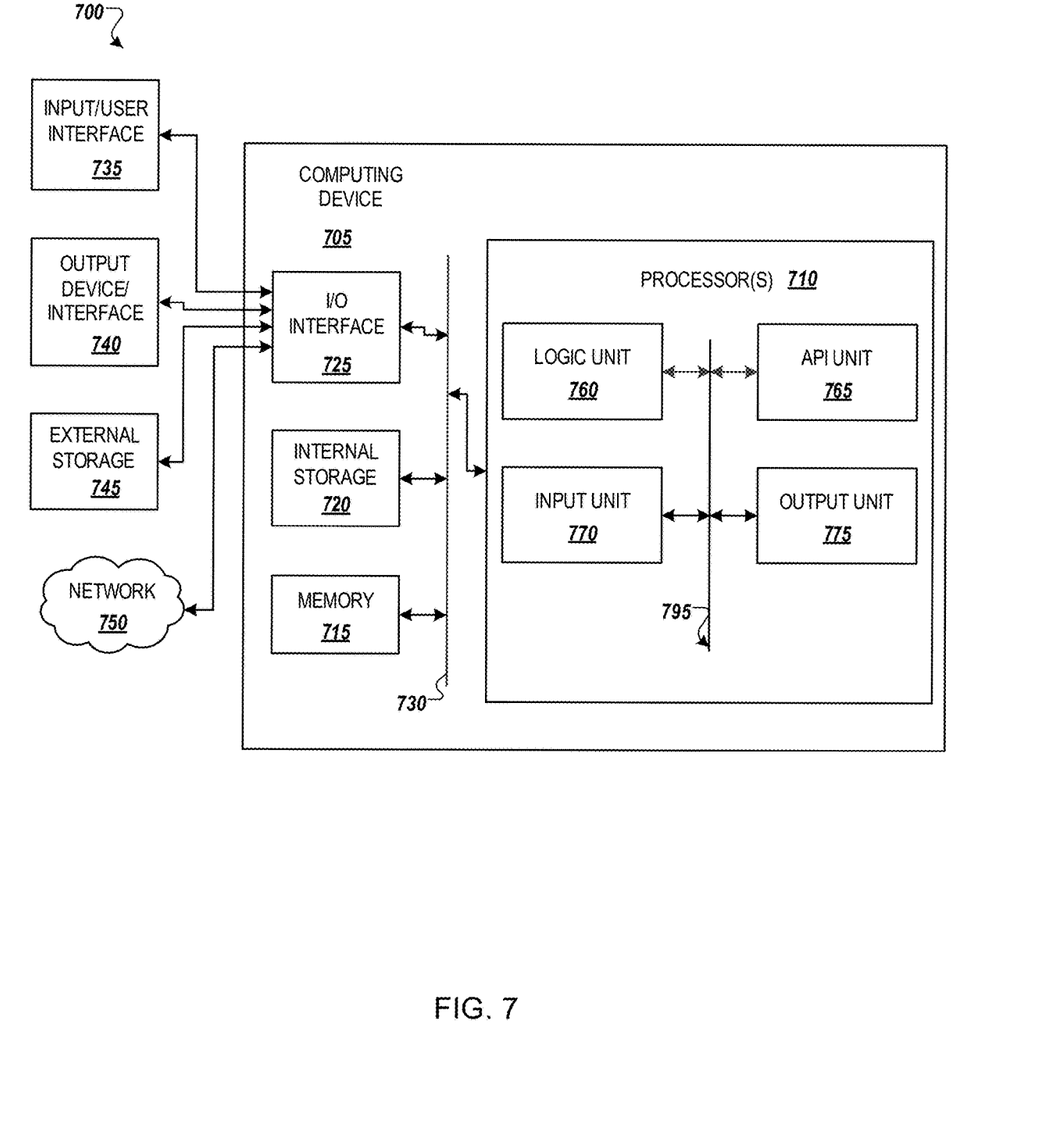
FIG. 7 illustrates an example computing environment with an example computer device suitable for use in some example implementations.
Figure 8:
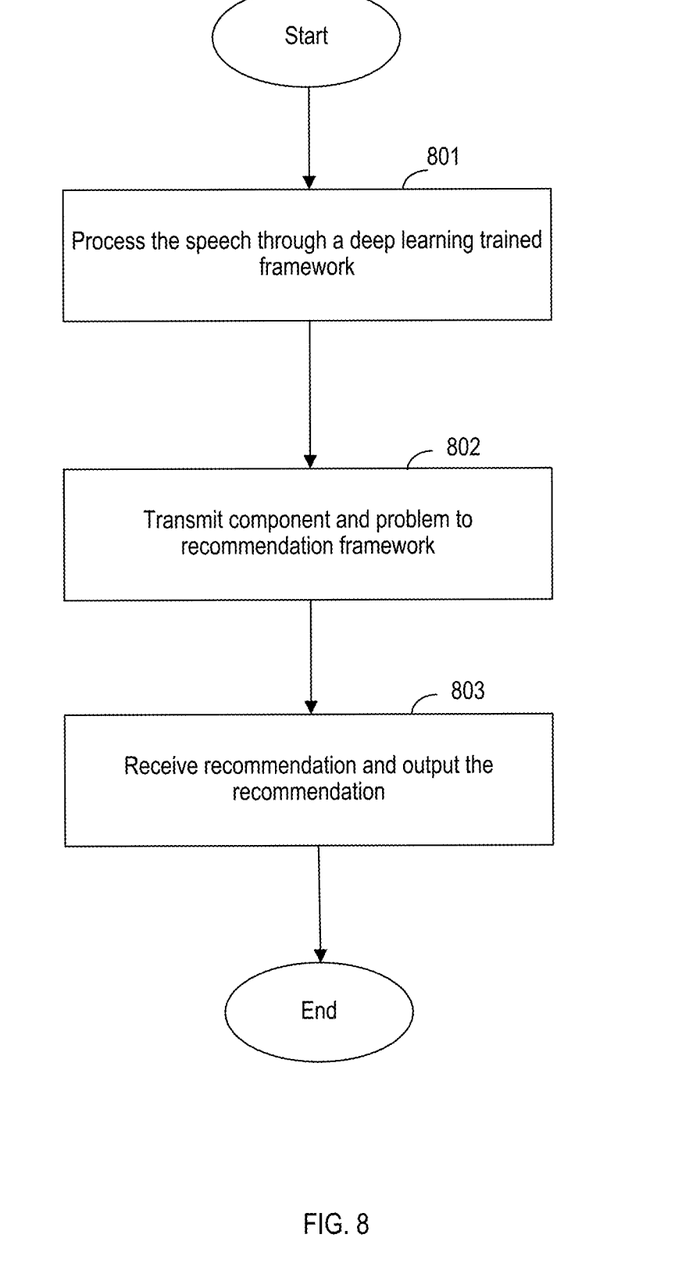
FIG. 8 illustrates an example flow diagram, in accordance with an example implementation.

Processor 601 can be in the form of a physical hardware processor such as a central processing unit (CPU) or a combination of hardware and software processors that are configured to execute the flow diagram of FIGS. 1(a), 2(a) and 8 to process the speech (e.g., convert into text) and then run it through a deep learning trained framework (e.g., the KB framework described herein) configured to identify components and problems from the speech through syntactical rules to extract a component and a problem associated with the component from the speech received through the microphone, provide the component and the problem to a recommendation framework configured to generate a recommendation for the component and the problem; and output the recommendation for the component and the problem through the speaker 605. In example implementations, the recommendation framework can be on a remote server as illustrated in FIG. 7, or a combination of a locally stored recommendations and reference through a server and communicatively coupled through baseband processor 603.

In an example implementation, the processor 601 is configured to provide the component and the problem into a process configured to generate a hierarchy of components involving problems assigned within the hierarchy as illustrated in FIGS. 4(*a*) and 4(*b*); and provide the hierarchy of components to the deep learning trained framework to reconfigure the deep learning trained framework. In this manner, the deep learning trained framework continues to execute machine learning to localize the implementation to the environment of the voice assistant system.

In an example implementation, the deep learning trained framework is generated through an embedding based pruning process executed on a seed dataset after processing by the syntactical rules as illustrated in FIGS. 2(*a*) and 2(*b*). The deep learning trained framework is configured to identify components and problems from the speech through syntactical rules to extract a component and a problem by conducting sequence tagging to tag portions of the speech as the component or the problem based on a syntax of the speech as described for example, with respect to the POS tagging implementations or other sequence tagging implementations described herein and as described with respect to FIG. 2(*a*).

In an example implementation, the deep learning trained framework is configured to identify components and problems from the speech through syntactical rules to extract a component and a problem by processing through an NLU system configured to tag portions of the speech as the component or the problem based on a syntax of the speech as described herein with respect to the NLU implementations. In example implementations, the component can be a part of an apparatus under diagnosis for repair, such as an automotive part or some aspect of an automobile (e.g., oil, exhaust pipe), parts of washing machines, and/or any other apparatus in accordance with the desired implementation. However, the present disclosure is not limited to physical components, and can also be extended to virtual/logical components, such as virtual file systems, software modules, and other virtual/logical components that can be subject to repair or technical support.

FIG. 7 illustrates an example computing environment with an example computer device suitable for use in some example implementations, such as a back end server configured to train and provide the deep learning trained framework to the voice assistant, as well as to facilitate the recommendation framework, or as a device other than a voice assistant system that utilizes the deep learning trained framework. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Depending on the desired implementations, example implementations as described herein can also be implemented in the environment as illustrated in FIG. 7. For example, processor 710 can be configured to execute the same functions as processor 601 as illustrated in FIG. 6 and can be configured to execute the flow diagrams as illustrated in FIGS. 1(*a*), 2(*a*) and 8. Further, in such an example implementation, speech does not need to be utilized and other forms of input (e.g., typed, through stylus, scanned, etc.) can be utilized to provide the keywords in accordance with the desired implementation.

As described above, although example implementations described herein involve speech to text, which can be transcribed either through speech processing machine systems or by human transcription, other input can be conducted through a user interface if desired, such as a search box, which can be processed as speech. Example implementations described herein utilize short text utterances that can be broken down into component and problem based on the syntactical structure of the short text utterances as illustrated in FIG. 2(*b*), thus any method to input short text utterances that can be processed as speech can be utilized in accordance with the desired implementation.

FIG. 8 illustrates an example flow diagram for a voice assistant, in accordance with an example implementation. At 801, the voice assistant processes the speech (e.g., convert into text) and then run it through a deep learning trained framework (e.g., the KB framework described herein) configured to identify components and problems from the speech through syntactical rules to extract a component and a problem associated with the component from the speech received through the microphone. At 802, the voice assistant provides the component and the problem to a recommendation framework configured to generate a recommendation for the component and the problem. When the recommendation is received, at 803, the voice assistant can then output the recommendation for the component and the problem through the speaker.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for processing speech for a voice assistant system, comprising:
   processing the speech through a deep learning trained framework configured to identify components and problems from the speech through syntactical rules to extract a component and a problem associated with the component from the speech received through the voice assistant system from the processing, wherein the component is a portion of an apparatus under diagnosis for repair, wherein the problem is directed to an issue of the component;

providing the component and the problem to a recommendation framework configured to generate a recommendation for the component and the problem; and outputting the recommendation for the component and the problem through the voice assistant system;

wherein the deep learning trained framework is configured to identify components and problems from the speech through syntactical rules to extract the component and the problem by processing through an NLU system configured to tag portions of the speech as the component or the problem based on a syntax of the speech, the syntactical rules indicative of an association of sequence patterns involving two or more of verb tenses, nouns, and adjectives, in the speech with candidates of the problem and the component in the portion of the speech associated with the sequence patterns.

2. The method of claim 1, further comprising providing the component and the problem into a process configured to generate a hierarchy of components comprising problems assigned within the hierarchy; and providing the hierarchy of components to the deep learning trained framework to reconfigure the deep learning trained framework.

3. The method of claim 1, wherein the deep learning trained framework is generated through an embedding based pruning process executed on a seed dataset after processing by the syntactical rules.

4. A non-transitory computer readable medium, storing instructions for processing speech for a voice assistant system, the instructions comprising:

processing the speech through a deep learning trained framework configured to identify components and problems from the speech through syntactical rules to extract a component and a problem associated with the component from the speech received through the voice assistant system from the processing, wherein the component is a portion of an apparatus under diagnosis for repair, wherein the problem is directed to an issue of the component;

providing the component and the problem to a recommendation framework configured to generate a recommendation for the component and the problem; and outputting the recommendation for the component and the problem through the voice assistant system;

wherein the deep learning trained framework is configured to identify components and problems from the speech through syntactical rules to extract the component and the problem by processing through an NLU system configured to tag portions of the speech as the component or the problem based on a syntax of the speech, the syntactical rules indicative of an association of sequence patterns involving two or more of verb tenses, nouns, and adjectives, in the speech with candidates of the problem and the component in the portion of the speech associated with the sequence patterns.

5. The non-transitory computer readable medium of claim 4, the instructions further comprising providing the component and the problem into a process configured to generate a hierarchy of components comprising problems assigned within the hierarchy; and providing the hierarchy of components to the deep learning trained framework to reconfigure the deep learning trained framework.

6. The non-transitory computer readable medium of claim 4, wherein the deep learning trained framework is generated through an embedding based pruning process executed on a seed dataset after processing by the syntactical rules.

7. A voice assistant system, comprising:

a microphone configured to receive speech;

a speaker; and a processor, configured to:

process the speech through a deep learning trained framework configured to identify components and problems from the speech through syntactical rules to extract a component and a problem associated with the component from the speech received through the microphone, wherein the component is a portion of an apparatus under diagnosis for repair, wherein the problem is directed to an issue of the component;

provide the component and the problem to a recommendation framework configured to generate a recommendation for the component and the problem; and output the recommendation for the component and the problem through the speaker;

wherein the deep learning trained framework is configured to identify components and problems from the speech through syntactical rules to extract the component and the problem by processing through an NLU system configured to tag portions of the speech as the component or the problem based on a syntax of the speech, the syntactical rules indicative of an association of sequence patterns involving two or more of verb tenses, nouns, and adjectives, in the speech with candidates of the problem and the component in the portion of the speech associated with the sequence patterns.

8. The voice assistant system of claim 7, the processor configured to provide the component and the problem into a process configured to generate a hierarchy of components comprising problems assigned within the hierarchy; and providing the hierarchy of components to the deep learning trained framework to reconfigure the deep learning trained framework.

9. The voice assistant system of claim 7, wherein the deep learning trained framework is generated through an embedding based pruning process executed on a seed dataset after processing by the syntactical rules.

10. The method of claim 1, wherein the deep learning trained framework is configured to process the extracted component through a hierarchy of components to determine the component to be provided to the recommendation framework.

11. The method of claim 1, wherein the deep learning trained framework is configured to tag remaining portions of the speech through the NLU system to learn new sequence patterns and syntactical rules.

* * * * *